(12) United States Patent
Wu et al.

(10) Patent No.: US 12,680,982 B2
(45) Date of Patent: Jul. 14, 2026

(54) ELASTIC WAVE RADAR DETECTION DEVICE AND METHOD

(71) Applicants: Southwest Petroleum University, Chengdu (CN); Sichuan Central Inspection Technology Inc, Zigong City (CN)

(72) Inventors: Jiaye Wu, Chengdu (CN); Biao Su, Chengdu (CN); Hongyin Wang, Chengdu (CN); Xiujuan Liu, Chengdu (CN); Jing Chen, Chengdu (CN); Wei Wang, Chengdu (CN); Hui Xie, Chengdu (CN)

(73) Assignees: Southwest Petroleum University, Chengdu (CN); Sichuan Central Inspection Technology Inc, Zigong City (CN)

( * ) Notice: Subject to any disclaimer, the term of this patent is extended or adjusted under 35 U.S.C. 154(b) by 337 days.

(21) Appl. No.: 18/457,885

(22) Filed: Aug. 29, 2023

(65) Prior Publication Data

US 2024/0077454 A1 Mar. 7, 2024

(30) Foreign Application Priority Data

Sep. 2, 2022 (CN) .......................... 202211074929.X

(51) Int. Cl.
*G01N 29/04* (2006.01)
*G01N 29/46* (2006.01)

(52) U.S. Cl.
CPC ........... *G01N 29/045* (2013.01); *G01N 29/46* (2013.01); *G01N 2291/023* (2013.01)

(58) Field of Classification Search
CPC ................. G01N 29/045; G01N 29/46; G01N 2291/023; G01N 29/22; G01N 29/345; G01N 2291/0289; G01N 2291/0428
See application file for complete search history.

(56) References Cited

U.S. PATENT DOCUMENTS

2017/0138908 A1* 5/2017 Miki .................... G01N 29/045

FOREIGN PATENT DOCUMENTS

CN 108593769 B * 8/2020 ........... G01N 29/045

OTHER PUBLICATIONS

CN108593769B English translation, see attached document (Year: 2020).*

* cited by examiner

*Primary Examiner* — Xin Y Zhong
(74) *Attorney, Agent, or Firm* — JEEN IP LAW, LLC

(57) ABSTRACT

Provided are an elastic wave radar detection device and method. The device includes a vibration excitation device, a first sensor, a second sensor, and a controller. The first sensor is arranged on the vibration excitation device, and the second sensor is arranged on a detected object. The first sensor is used to collect vibration excitation information, namely, an incident signal, and the second sensor is used to collect information of the detected object, namely, a vibration signal. Both the first sensor and the second sensor are connected to the controller. The elastic wave radar detection device and method provided by the present disclosure can receive vibration excitation information and introduce a standard incident signal, so as to achieve the uniformity of signals and improve the detection accuracy.

9 Claims, 12 Drawing Sheets

ELASTIC WAVE RADAR DETECTION DEVICE AND METHOD

CROSS-REFERENCE TO RELATED APPLICATION

This patent application claims the benefit and priority of Chinese Patent Application No. 202211074929.X, filed with the China National Intellectual Property Administration on Sep. 2, 2022, the disclosure of which is incorporated by reference herein in its entirety as part of the present application.

TECHNICAL FIELD

The present disclosure relates to the technical field of geotechnical engineering, and in particular to an elastic wave radar detection device and method.

BACKGROUND

At present, the elastic wave detection of structural debonding mainly uses a knocking method, but the knocking method does not record the information of vibration excitation itself, so the vibration excitation device, force and the vibration excitation position and other will lead to different forms of elastic waves received each time in actual detection, that is, the homogeneity of the received vibration signals is poor, directly affecting detection results. Therefore, it is necessary to design an elastic wave radar detection device and method.

SUMMARY

An objective of the present disclosure is to provide an elastic wave radar detection device and method, which can receive vibration excitation information and introduce a standard incident signal, so as to achieve the uniformity of signals and improve the detection accuracy.

In order to achieve the above objective, the present disclosure provides the following solution:

An elastic wave radar detection device includes a vibration excitation device, a first sensor, a second sensor, and a controller. The first sensor is arranged on the vibration excitation device, and the second sensor is arranged on a detected object. The first sensor is used to collect vibration excitation information, i.e., an incident signal. The second sensor is used to collect information of the detected object, i.e., a vibration signal. Both the first sensor and the second sensor are connected to the controller.

Alternatively, the vibration excitation device is a vibration excitation hammer. The vibration excitation hammer includes a handle and a circular-arc-shaped hammer head. The handle is fixedly connected to the circular-arc-shaped hammer head, the first sensor is fixedly arranged on the circular-arc-shaped hammer head, and a direction of the first sensor is perpendicular to a circular arc surface, making contact with the ground, of the circular-arc-shaped hammer head.

Alternatively, the vibration excitation device is a vibration excitation rod. The vibration excitation rod includes a rod body, a connector, and a hammer head. One end of the rod body is provided with a first thread, one end of the connector is provided with a first screw hole corresponding to the first thread, and the connector is fixedly arranged on the rod body through the first thread and the first screw hole. The other end of the connector is provided with a second screw hole, one end of the hammer head is provided with a second thread corresponding to the second screw hole, and the hammer head is fixedly arranged on the connector through the second thread and the second screw hole. The other end of the hammer head is provided with a circular arc surface for making contact with the detected object. The first sensor is fixedly arranged inside the rod body or the connector, and a direction of the first sensor is consistent with an axis direction of the rod body.

The present disclosure also provides an elastic wave radar detection method, which is applied to the elastic wave radar detection device above and includes the following steps:

Step 1: knocking on different positions of a detected object through a vibration excitation device to obtain data for multiple knocks, comprising an incident signal and a vibration signal;

Step 2: processing the incident signal to obtain a standard incident signal;

Step 3: respectively performing Fourier transform on the incident signal, the vibration signal and the standard incident signal after each knock to obtain respective corresponding frequency domain complex representation forms, and obtaining frequency domain representation forms of a vibration signal similar to a radar wave according to the respective corresponding frequency domain complex representation forms and an elastic wave radar algorithm theoretical formula; and Step 4: performing inverse Fourier transform on the frequency domain representation form of the vibration signal similar to the radar wave, so as to obtain a time domain waveform of the processed vibration signal.

Alternatively, Step 1 of knocking on different positions of a detected object through a vibration excitation device to obtain data for multiple knocks which comprise an incident signal and a vibration signal specifically includes:

performing free-fall knocking on different positions of the detected object by a vibration excitation rod, or directly knocking different positions of the detected object by a vibration excitation hammer; collecting an incident signal by a first sensor, and collecting a vibration signal by a second sensor, where a position knocked by the vibration excitation device is close to the second sensor, and a distance from the position knocked by the vibration excitation device to the second sensor is not more than one quarter of a thickness of the detected object.

Alternatively, Step 2 of processing the incident signal to obtain a standard incident signal specifically includes:

the standard incident signal including a first vibration excitation standard wave, an average standard wave, a maximum-minimum intercepted standard wave and a minimum-maximum intercepted standard wave; collecting an incident signal waveform of a first knock, and taking a start point and an end point of the incident signal waveform of the first knock as a start point and an initial point of a standard sinusoidal half wave with an amplitude of 1 to obtain the first vibration excitation standard wave; collecting incident signal waveforms of all knocks, taking an average value of start points and an average value of end points of the incident signal waveforms of all knocks as a start point and an end point of the standard sinusoidal half wave with an amplitude of 1 to obtain an average standard wave; taking the maximum value of the start points and the minimum value of the end points of the incident signal waveform of all knocks as a start point and an end point of a standard sinusoidal half-wave with an amplitude of 1 to obtain the maximum-minimum intercepted standard wave; and taking the minimum value of the start points and the maximum value of the end points of the incident signal waveforms of all knocks as a start point and an end point of a standard sinusoidal half wave with an amplitude of 1 to obtain the minimum-maximum intercepted standard wave.

Alternatively, Step 3 of respectively performing Fourier transform on the incident signal, the vibration signal and the standard incident signal after each knock to obtain respective corresponding frequency domain complex representation forms, and obtaining frequency domain representation forms of a vibration signal similar to a radar wave according to the respective corresponding frequency domain complex representation forms and an elastic wave radar algorithm theoretical formula specifically comprises:

respectively performing Fourier transform on the incident signal, the vibration signal and the standard incident signal after each knock to obtain respective corresponding frequency domain complex representation forms, which are respectively $X_i(f)$, $Y_i(f)$ and $X_0(f)$; and substituting $X_i(f)$, $Y_i(f)$ and $X_0(f)$ into an elastic wave radar algorithm theoretical formula to obtain a frequency domain representation form of a vibration signal similar to a radar wave:

$$Y_i'(f) = \frac{Y_i(f)}{X_i(f)} X_0(f)$$

According to the specific embodiments provided by the present disclosure, the present disclosure discloses the following technical effects: an elastic wave radar detection device is provided with a first sensor and a second sensor, which are used to collect an incident signal and a vibration signal, respectively. Two types of vibration excitation devices are provided for the device, and a vibration excitation hammer or a vibration excitation rod can be selected for detection as required. The method includes the following steps: knocking on different positions of a detected object through a vibration excitation device to obtain data for multiple knocks, comprising an incident signal and a vibration signal; processing the incident signal to obtain a standard incident signal; respectively performing Fourier transform on the incident signal, the vibration signal and the standard incident signal after each knock to obtain respective corresponding frequency domain complex representation forms, and obtaining frequency domain representation forms of a vibration signal similar to a radar wave according to the respective corresponding frequency domain complex representation forms and an elastic wave radar algorithm theoretical formula; and performing inverse Fourier transform on the frequency domain representation form of the vibration signal similar to a radar wave, so as to obtain a time domain waveform of the processed vibration signal; and then correspondingly processing the vibration signals of knocks at different positions into time domain waveforms similar to the radar wave. Moreover, the standard incident signal is introduced, such that the problem that the amplitudes and start points of the vibration signals are inconsistent can be solved, and the uniformity is improved. During specific use, the characteristics of the detected object can be intuitively analyzed by arranging the vibration signals on the same interface according to a knocking order, and the detection accuracy is improved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
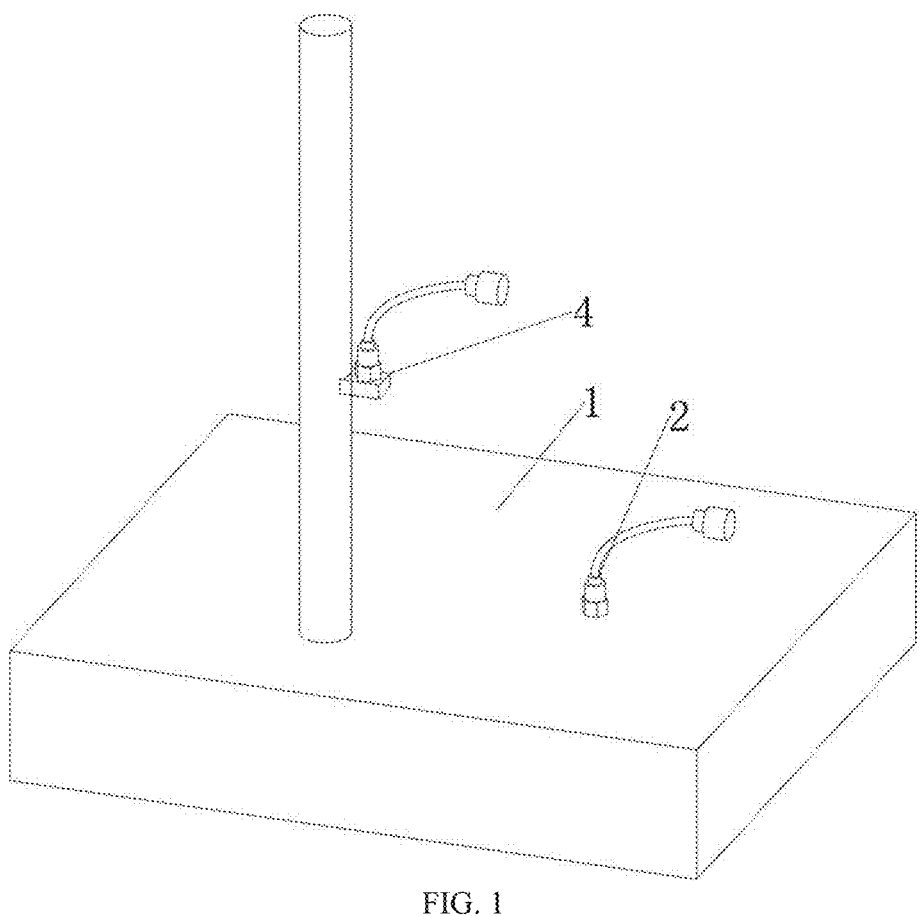
FIG. 1 is a structural schematic diagram of an elastic wave radar detection device in accordance with an embodiment the present disclosure during use.

In the drawings: 1—detected object; 2—second sensor; 3—circular-arc-shaped hammer head; 4—first sensor; 5—handle; 6—rod body; 7—connector; 8—hammer head; 9—second thread; 10—first thread; 11—first screw hole; 12—second screw hole; 13—circular arc surface.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide an elastic wave radar detection device and method, which can receive vibration excitation information and introduce a standard incident signal, so as to achieve the uniformity of signals and improve the detection accuracy.

To make the above objectives, features and advantages of the present disclosure more apparently and understandably, the present disclosure is further described in detail below with reference to the accompanying drawings and specific embodiments.

As shown in FIG. 1 through FIG. 6, an elastic wave radar detection device includes a vibration excitation device, a first sensor 4, a second sensor 2, and a controller. The first sensor 4 is arranged on the vibration excitation device, and the second sensor 2 is arranged on a detected object 1. The first sensor 4 is used to collect vibration excitation information, i.e., an incident signal. The second sensor 2 is used to collect information of the detected object 1, i.e., a vibration signal. Both the first sensor 4 and the second sensor 2 are connected to the controller. A system response frequency spectrum is obtained through the vibration signal and the incident signal, and a standard incident signal is introduced to finally obtain a vibration signal similar to a radar wave.

The vibration excitation device may employ a vibration excitation hammer to knock manually, and can also employ a vibration excitation rod to perform free-fall knocking.

Figure 2:
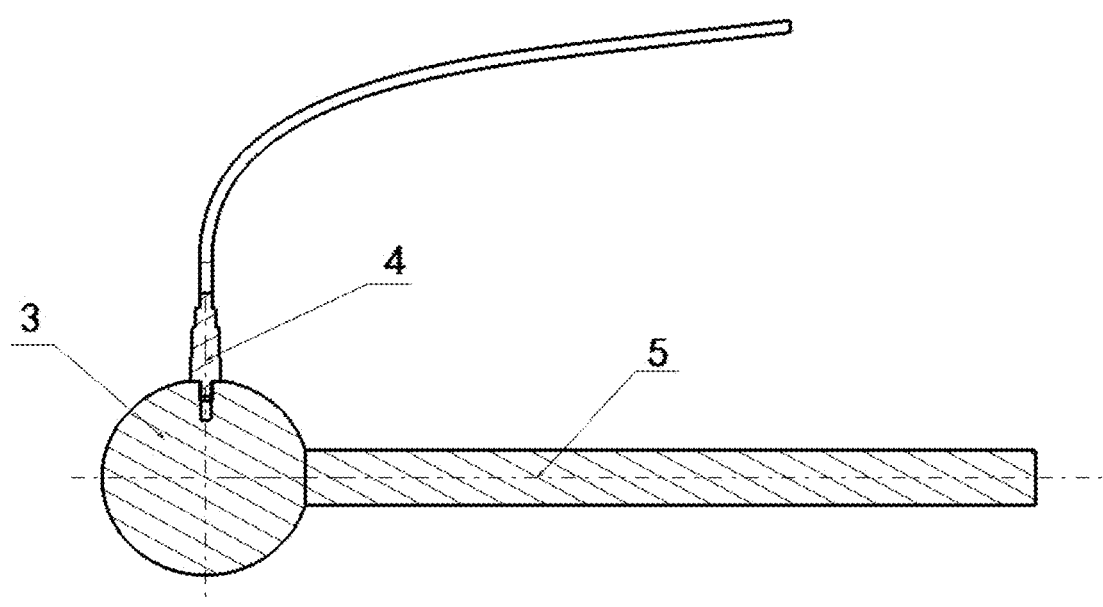
FIG. 2 is a structural schematic diagram of a vibration excitation hammer.
Figure 3:
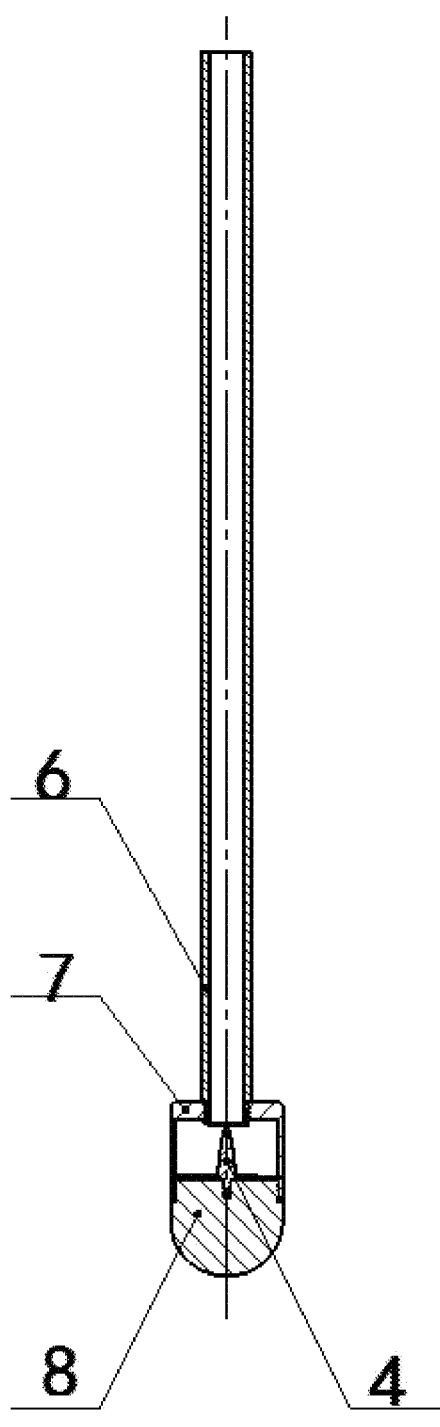
FIG. 3 is a structural schematic diagram of a vibration excitation rod.
Figure 4:
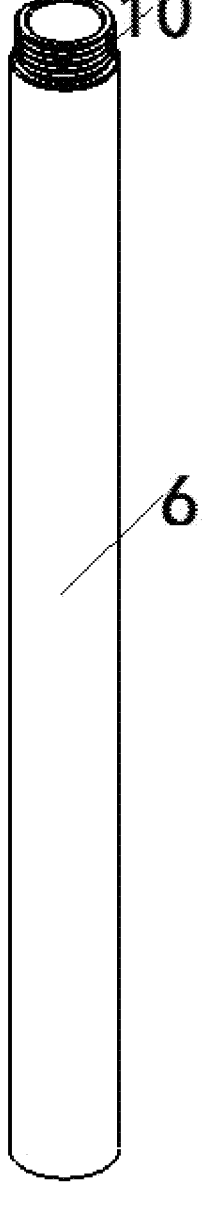
FIG. 4 is a structural schematic diagram of a rod body.
Figure 5:
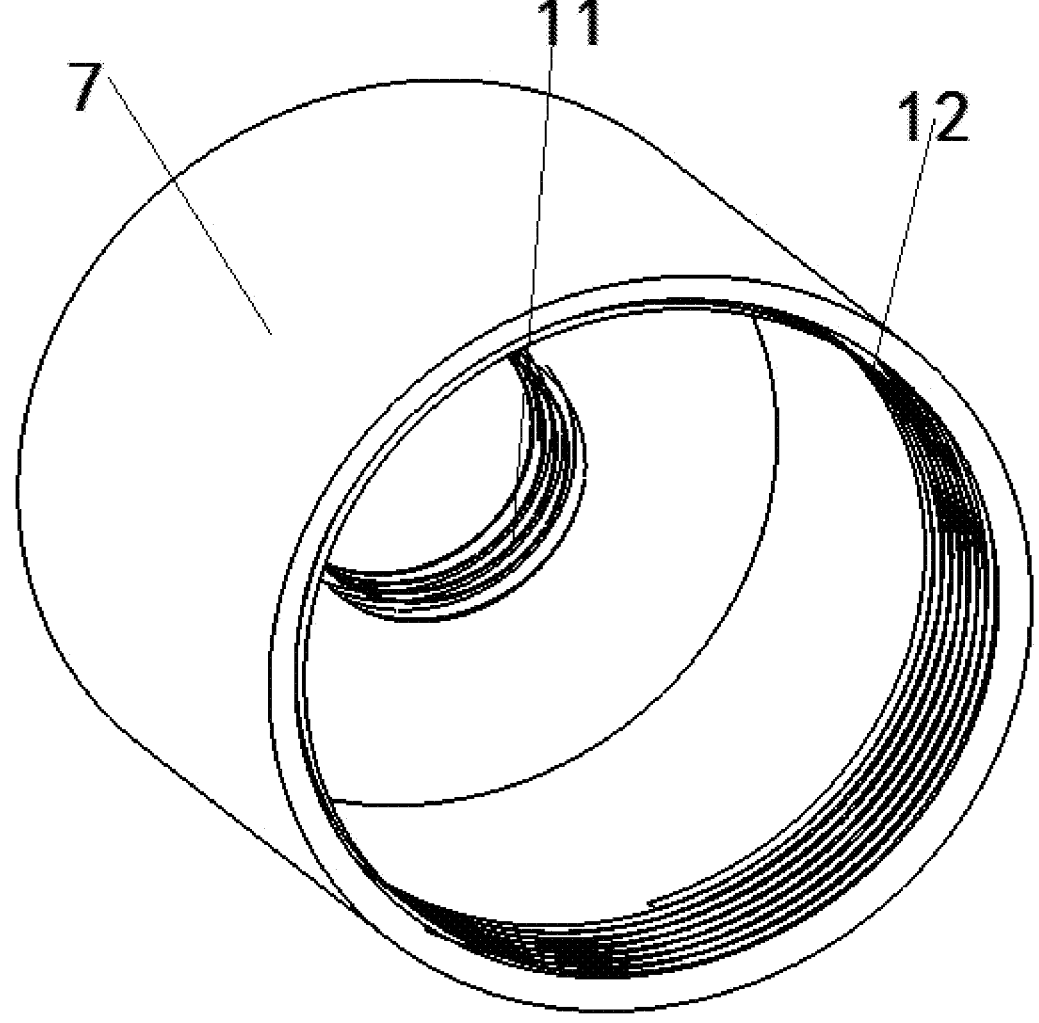
FIG. 5 is a structural schematic diagram of a connector.
Figure 6:
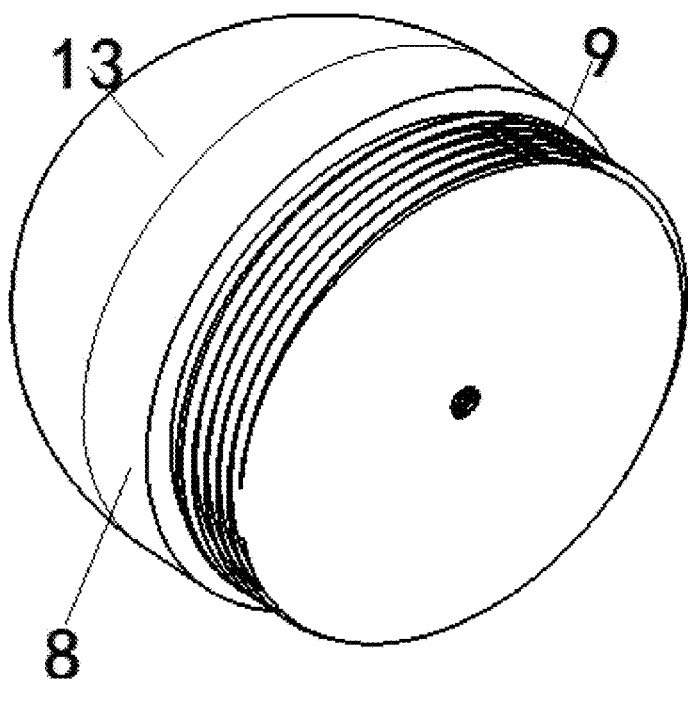
FIG. 6 is a structural schematic diagram of a hammer head.
Figure 7:
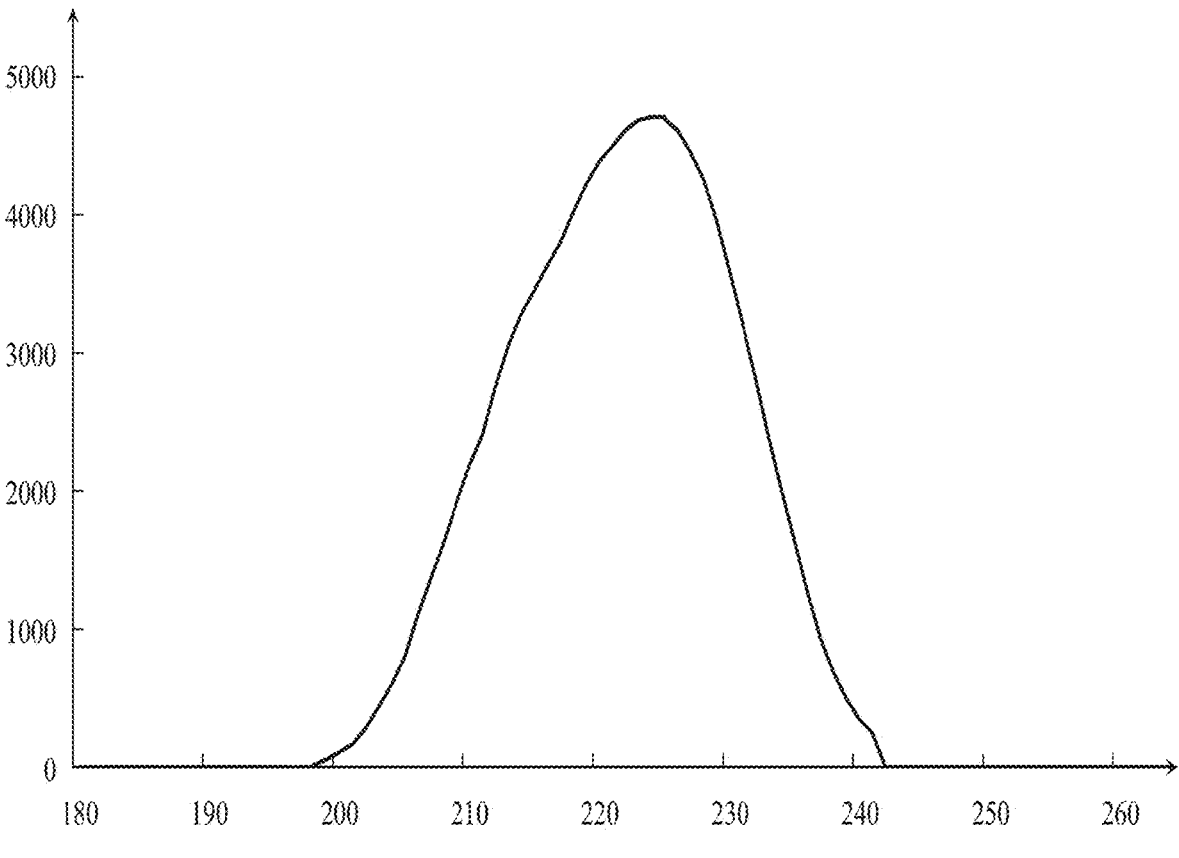
FIG. 7 is an oscillogram of an incident signal wave of a first knock.
Figure 8:
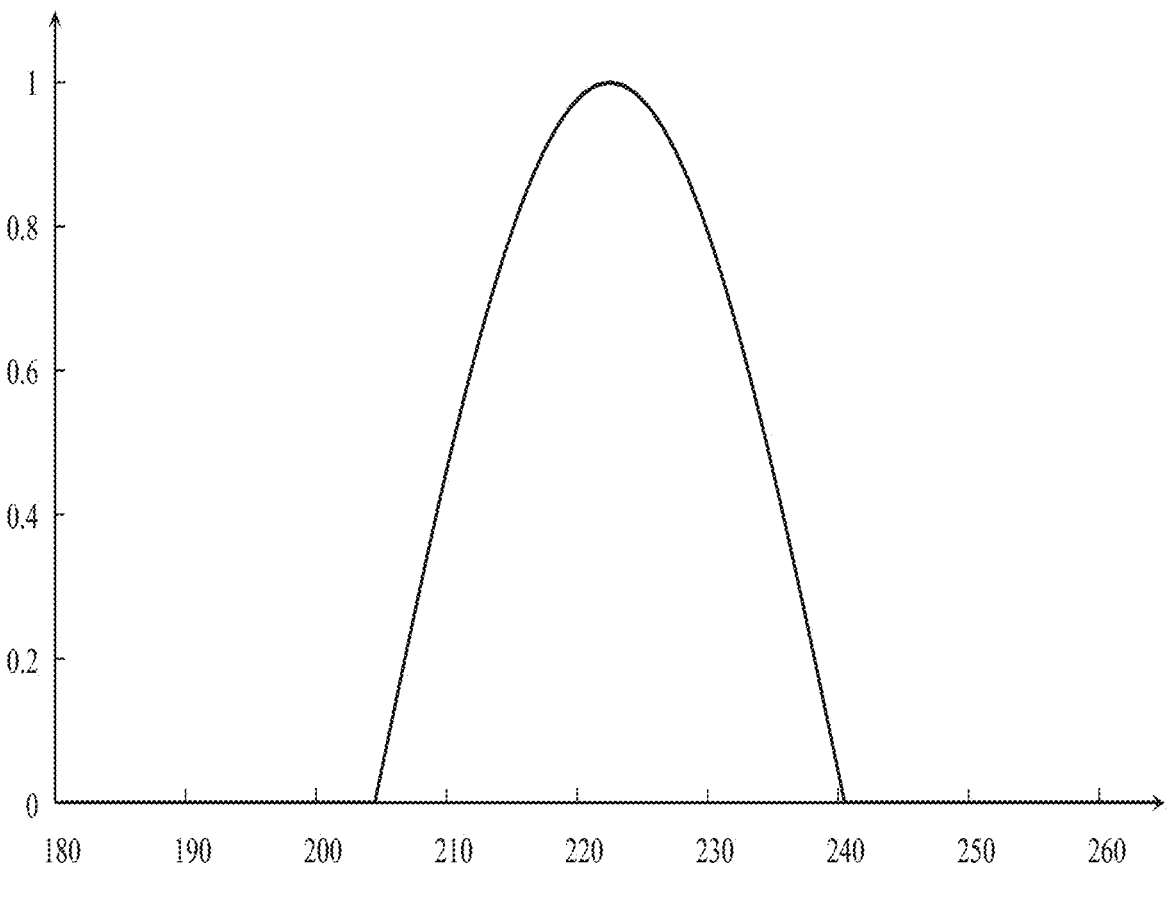
FIG. 8 is an oscillogram of a first vibration excitation standard wave.
Figure 9:
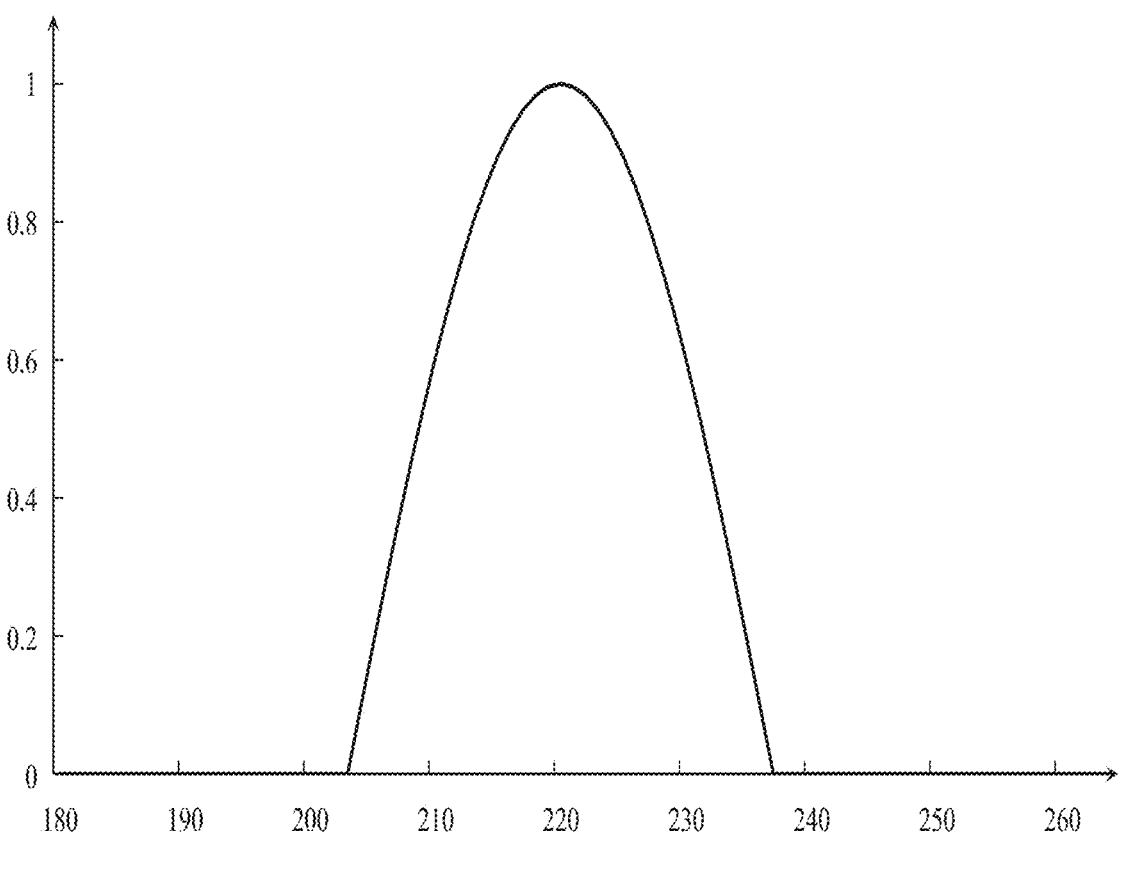
FIG. 9 is an oscillogram of an average standard wave.
Figure 10:
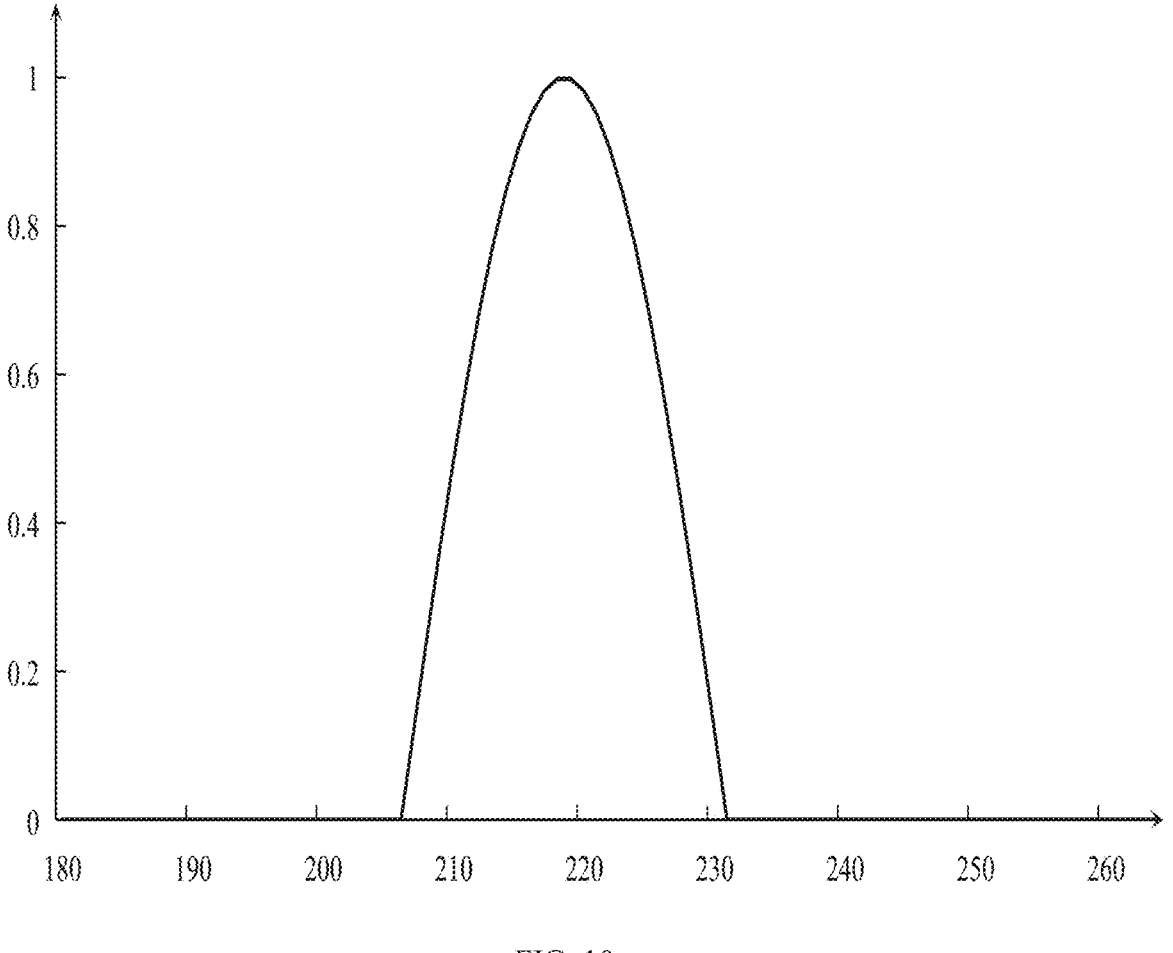
FIG. 10 is an oscillogram of a maximum-minimum intercepted standard wave.
Figure 11:
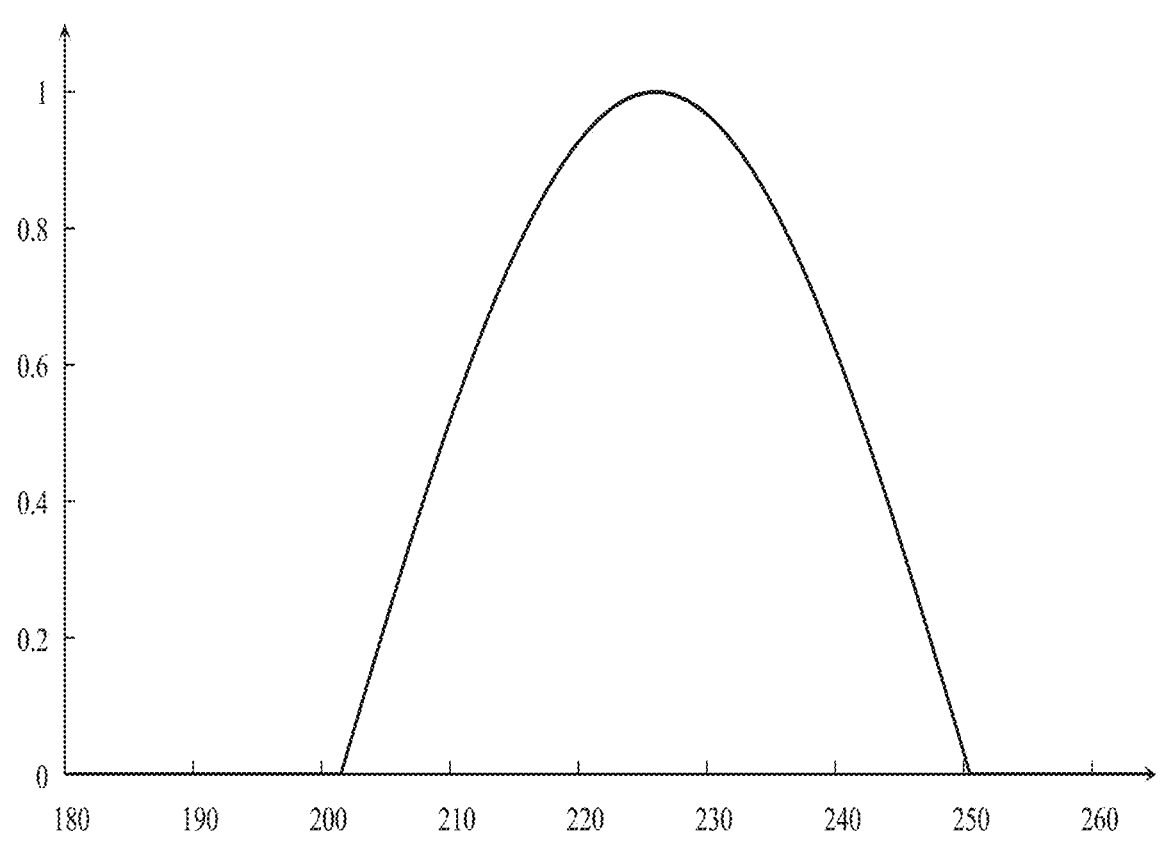
FIG. 11 is an oscillogram of a minimum-maximum intercepted standard wave.

As shown in FIG. 2, the vibration excitation hammer includes a handle 5 and a circular-arc-shaped hammer head 3. The handle 5 is fixedly connected to the circular-arc-shaped hammer head 3, the first sensor 4 is fixedly arranged on the circular-arc-shaped hammer head 3, and a direction of the first sensor 4 is perpendicular to a circular arc surface, making contact with the ground, of the circular-arc-shaped hammer head 3. The circular-arc-shaped hammer head 3 can be provided with a screw groove corresponding to the first sensor 4, the first sensor 4 is provided with a thread corresponding to the screw groove, and the first sensor 4 is fixedly arranged on the circular-arc-shaped hammer 3 through the thread and the screw groove. Correspondingly, the handle 5 and the circular-arc-shaped hammer 3 can also be fixed through threaded connection, or can be directly welded.

As shown in FIG. 3 through FIG. 6, the vibration excitation rod includes a rod body 6, a connector 7, and a hammer head 8. One end of the rod body 6 is provided with a first thread 10, one end of the connector 7 is provided with a first screw hole 11 corresponding to the first thread 10, and the connector 7 is fixedly arranged on the rod body 6 through the first thread 10 and the first screw hole 11. The other end of the connector 7 is provided with a second screw hole 12, one end of the hammer head 8 is provided with a second thread 9 corresponding to the second screw hole 12, and the hammer head 8 is fixedly arranged on the connector 7 through the second thread 9 and the second screw hole 12. The other end of the hammer head 8 is provided with a circular arc surface 13 for making contact with the detected object 1. The first sensor 4 is fixedly arranged inside the rod body 6 or the connector 7, and a direction of the first sensor is consistent with an axis direction of the rod body.

Both the first sensor 4 and the second sensor 2 employ vibration excitation sensors.

The device may also be provided with an oscilloscope or a PC terminal for viewing individual waveforms.

The present disclosure also provides an elastic wave radar detection method, which is applied to the elastic wave radar detection device above and includes the following steps:

Step 1: knocking on different positions of a detected object through a vibration excitation device to obtain data for a plurality of knocks, comprising an incident signal and a vibration signal;

Step 2: processing the incident signal to obtain a standard incident signal;

Step 3: respectively performing Fourier transform on the incident signal, the vibration signal and the standard incident signal after each knock to obtain respective corresponding frequency domain complex representation forms, and obtaining frequency domain representation forms of a vibration signal similar to a radar wave according to the respective corresponding frequency domain complex representation forms and an elastic wave radar algorithm theoretical formula; and Step 4: performing inverse Fourier transform on the frequency domain representation form of the vibration signal similar to the radar wave, so as to obtain a time domain waveform of the processed vibration signal, wherein the vibration signals similar to the radar wave are arranged on the same interface according to a knocking order to facilitate the viewing, and the vibration signals similar to the radar wave may also be viewed through a radar gray map and a color-banded isoline map.

Step 1 of knocking on different positions of a detected object through a vibration excitation device to obtain a plurality of knocking data, comprising an incident signal and a vibration signal is specifically as follows.

Different positions of the detected object are subjected to free fall knocking by a vibration excitation rod, or different positions of the detected object are directly knocked by a vibration excitation hammer. A first sensor is used to collect an incident signal, and a second sensor is used to collect a vibration signal, and data of multiple knocks are stored in the same data file, a position knocked by the vibration excitation device is close to the second sensor, and a distance from the position knocked by the vibration excitation device to the second sensor is not more than one quarter of a thickness of the detected object.

Step 2 of processing the incident signal to obtain a standard incident signal is specifically as follows.

The standard incident signal includes a first vibration excitation standard wave, an average standard wave, a maximum-minimum intercepted standard wave and a minimum-maximum intercepted standard wave. An incident signal waveform of a first knock is collected, and a start point and an end point of the incident signal waveform of the first knock are respectively used as a start point and an initial point of a standard sinusoidal half wave with an amplitude of 1 to obtain the first vibration excitation standard wave. Incident signal waveforms of all knocks are collected, and an average value of start points and an average value of end points of the incident signal waveforms of all knocks are respectively used as a start point and an end point of the standard sinusoidal half wave with an amplitude of 1 to obtain an average standard wave. The maximum value of the start points and the minimum value of the end points of the incident signal waveform of all knocks are respectively used as a start point and an end point of the standard sinusoidal half-wave with an amplitude of 1 to obtain the maximum-minimum intercepted standard wave. The minimum value of the start points and the maximum value of the end points of the incident signal waveforms of all knocks are respectively used as a start point and an end point of a standard sinusoidal half wave with an amplitude of 1 to obtain the minimum-maximum intercepted standard wave.

The incident signal waveform of the first knock, the standard incident signal of the first knock, the average standard wave, the maximum-minimum intercepted standard wave and the minimum-maximum intercepted standard wave according to an embodiment of the present disclosure are shown in FIG. 7 through FIG. 11.

The standard incident signal also includes a sinusoidal half wave with any start point, any half wave width and any amplitude.

Step 3 of respectively performing Fourier transform on the incident signal, the vibration signal and the standard incident signal after each knock to obtain respective corresponding frequency domain complex representation forms, and obtaining frequency domain representation forms of a vibration signal similar to a radar wave according to the respective corresponding frequency domain complex representation forms and an elastic wave radar algorithm theoretical formula is specifically as follows.

Fourier transform is respectively conducted on the incident signal, the vibration signal and the standard incident signal after each knock to obtain respective corresponding frequency domain complex representation forms, which are respectively $X_i(f)$, $Y_i(f)$ and $X_0(f)$; and $X_i(f)$, $Y_i(f)$ and $X_0(f)$ are substituted into an elastic wave radar algorithm theoretical formula to obtain frequency domain representation forms of a vibration signal similar to a radar wave:

$$Y_i'(f) = \frac{Y_i(f)}{X_i(f)} X_0(f)$$

Inverse Fourier transform is conducted on the frequency domain representation form of the vibration signal similar to the radar wave to obtain a time domain waveform of the processed vibration signal.

Figure 12:
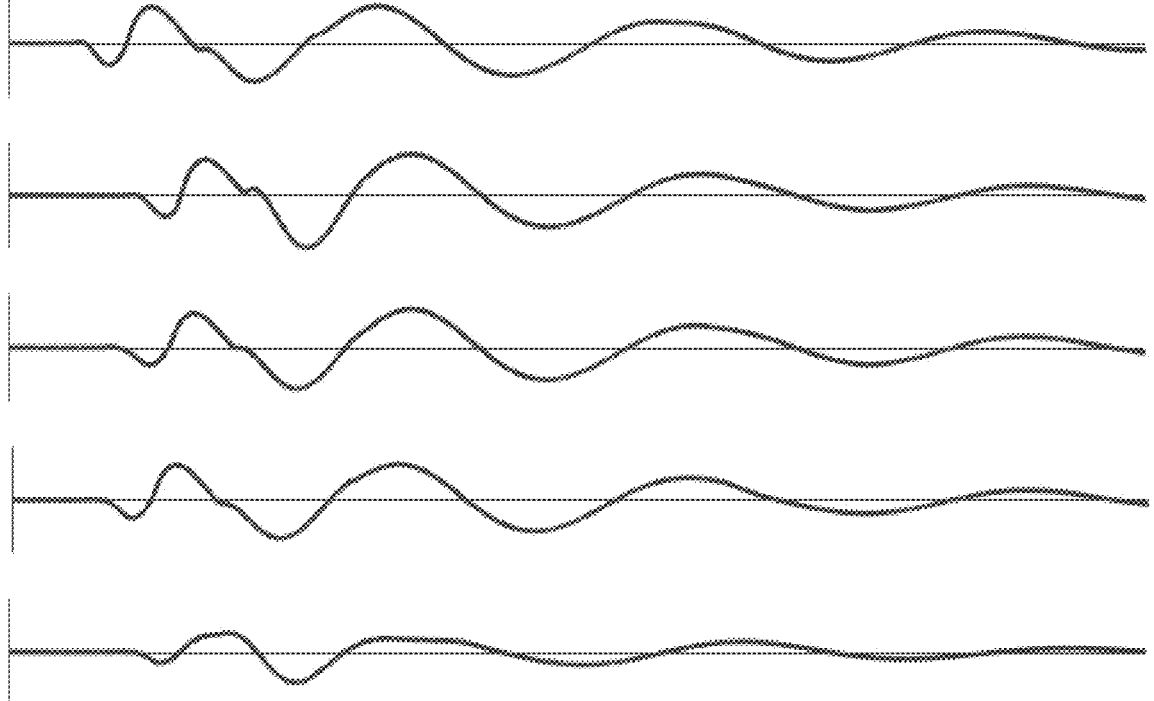
FIG. 12 is a vibration oscillogram.

As shown in FIG. 12, the start points and amplitudes of waveforms of the vibration signal wave are not uniform, and after being processed by the introduced standard incident signal, the start points are highly consistent, and the waveform amplitudes are uniform with the change of the start points of the standard incident signals.

Figure 13:
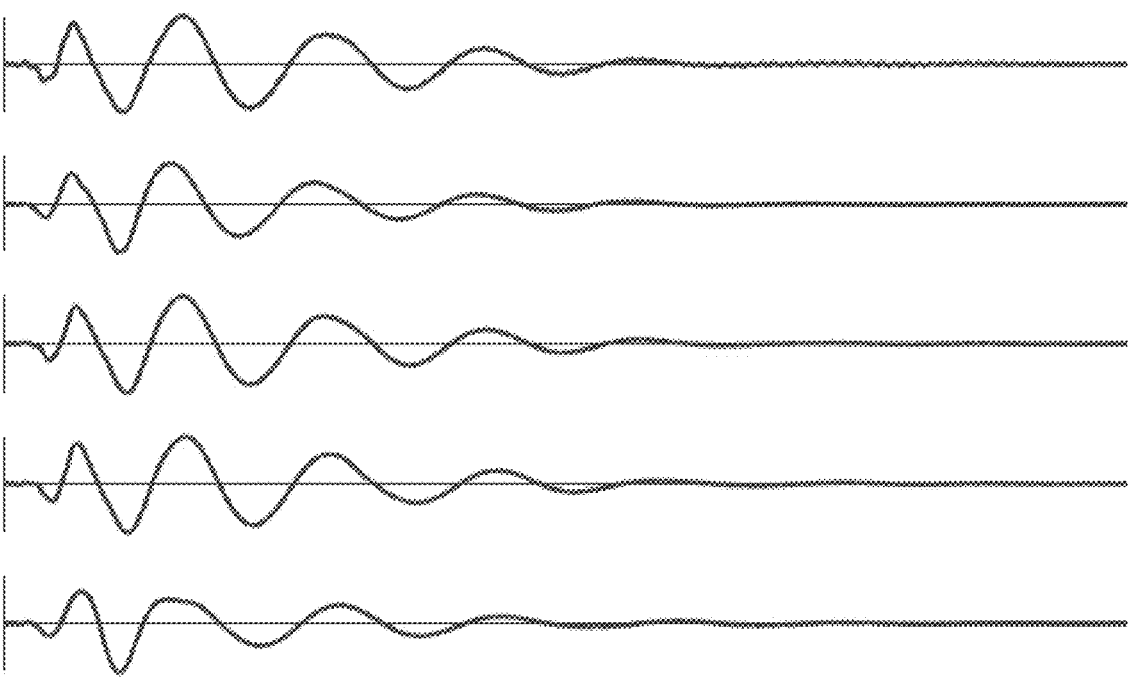
FIG. 13 is an oscillogram after a standard incident signal with a start point of 100 is introduced for processing.
Figure 14:
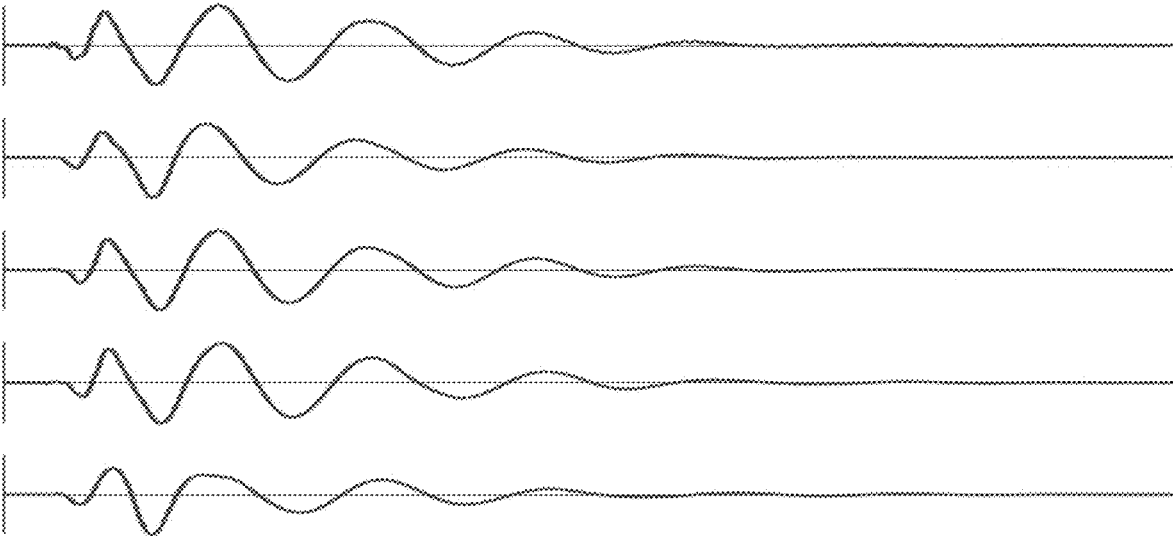
FIG. 14 an oscillogram after a standard incident signal with a start point of 400 is introduced for processing.

A conclusion obtained by introducing the sinusoidal half wave with any start point, any half wave width and any amplitude is as follows: the start point of the vibration signal is consistent with the start point of the standard incident signal, and the waveform amplitudes are uniform with the change of the start point of the standard incident signal, as shown in FIG. 13 and FIG. 14.

Figure 15:
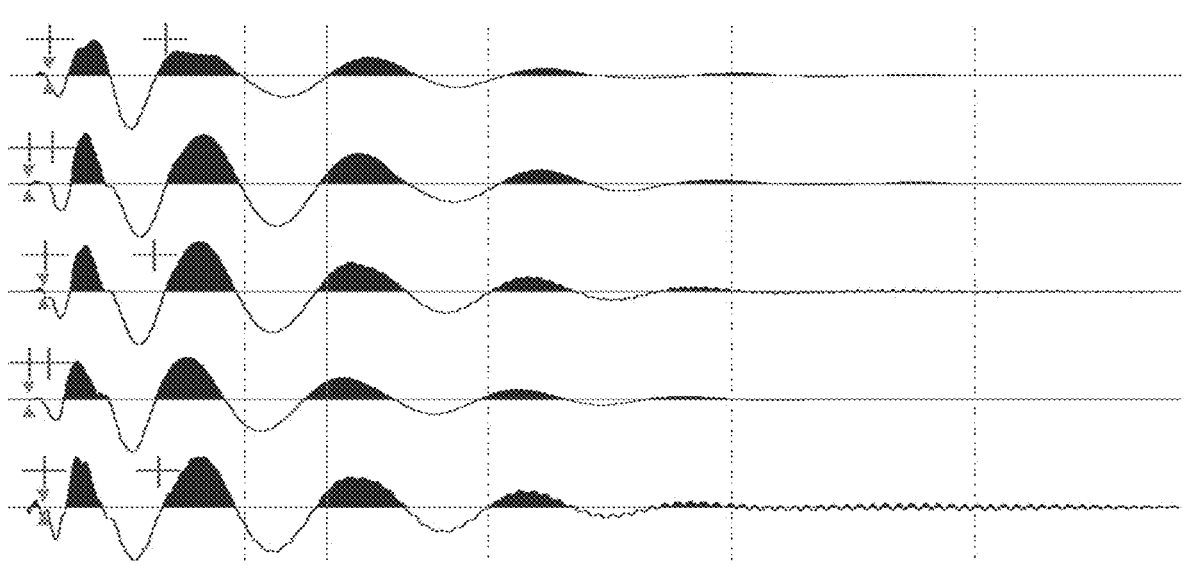
FIG. 15 is a time domain oscillogram after an average standard wave is introduced for processing.

As shown in FIG. 15, if it is for the uniformity of the start points of the vibration signals, it can be considered to directly introduce the sinusoidal half wave with any start point. In the field detection, knocking can be conducted at different positions of one survey line from one direction to another direction, and vibration signals generated by the knocks on the survey line can be calculated as above, and all processed knocking vibration signals are arranged on the same interface according to a knocking order to form a time domain oscillogram.

Figure 16:
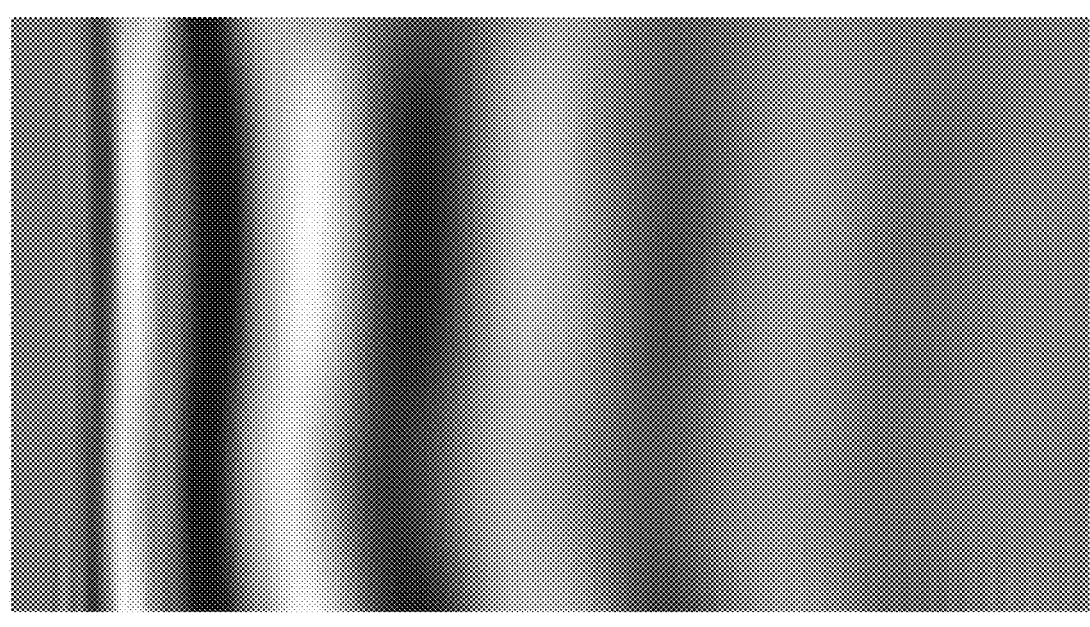
FIG. 16 is a radar gray map after an average standard wave is introduced for processing.

As shown in FIG. 16, the amplitudes of the vibration signals arranged on the same interface are represented by black, white and gray and are drawn on the same interface to form a radar gray map.

Figure 17:
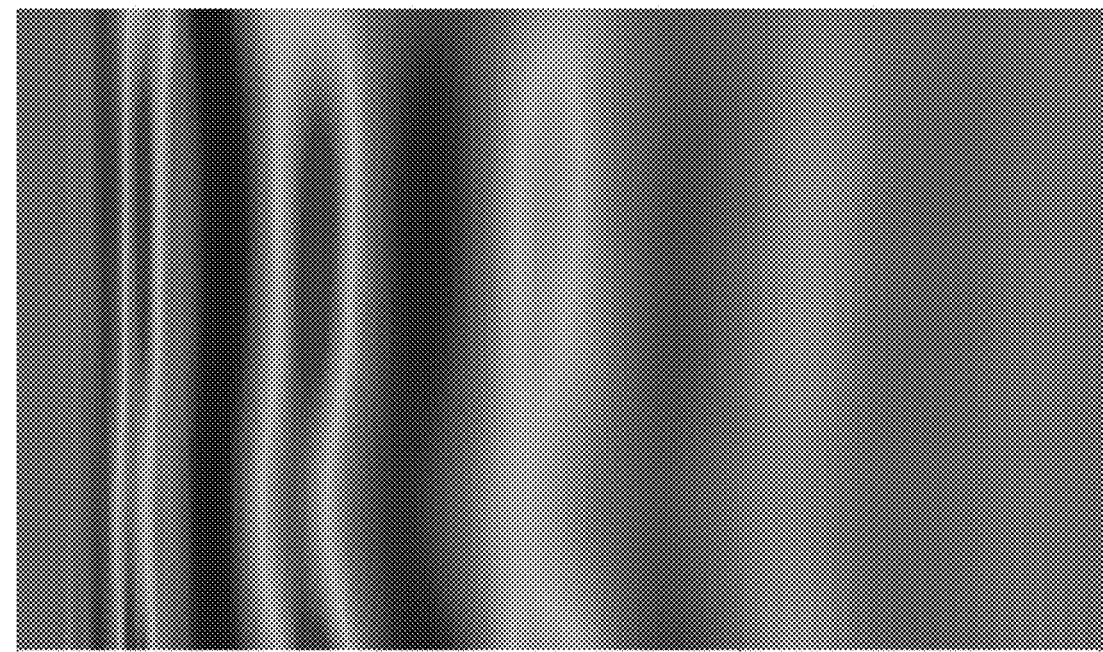
FIG. 17 is a color-banded isoline map after an average standard wave is introduced for processing.

As shown in FIG. 17, the amplitudes are expressed in color and drawn on the same interface to form a color-banded isoline map.

The characteristics of the detected object, such as debonding, insufficient thickness and incompactness, can be directly analyzed by using the analysis methods such as the time domain oscillogram, the radar gray map and the color-bonded isoline map.

According to the specific embodiments provided by the present disclosure, the present disclosure discloses the following technical effects: an elastic wave radar detection device is provided with a first sensor and a second sensor, which are used to collect an incident signal and a vibration signal, respectively. Two types of vibration excitation devices are provided for the device, and a vibration excitation hammer or a vibration excitation rod can be selected for detection as required. The method includes the following steps: knocking on different positions of a detected object through a vibration excitation device to obtain data for multiple knocks, comprising an incident signal and a vibration signal; processing the incident signal to obtain a standard incident signal; respectively performing Fourier transform on the incident signal, the vibration signal and the standard incident signal after each knock to obtain respective corresponding frequency domain complex representation forms, and obtaining frequency domain representation forms of a vibration signal similar to a radar wave according to the respective corresponding frequency domain complex representation forms and an elastic wave radar algorithm theoretical formula; and performing inverse Fourier transform on the frequency domain representation form of the vibration signal similar to the radar wave, so as to obtain a time domain waveform of the processed vibration signal; and then correspondingly processing the vibration signals of knocks at different positions into time domain waveforms similar to the radar waves. Moreover, the standard incident signal is introduced, such that the problem that the amplitudes and start points of the vibration signals are inconsistent can be solved, and the uniformity is improved. During specific use, the characteristics of the detected object can be intuitively analyzed by arranging the vibration signals on the same interface according to a knocking order, and the detection accuracy is improved.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An elastic wave radar detection method, applied to an elastic wave radar detection device, wherein the elastic wave radar detection device comprises a vibration excitation device, a first sensor, a second sensor, and a controller, wherein the first sensor is arranged on the vibration excitation device, the second sensor is arranged on a detected object, the first sensor is configured to collect vibration excitation information, namely, an incident signal, the second sensor is configured to collect information of the detected object, namely, a vibration signal, and both the first sensor and the second sensor are connected to the controller;

wherein the elastic wave radar detection method comprises the following steps:

Step 1: knocking on different positions of the detected object through the vibration excitation device to obtain data for a plurality of knocks, comprising the incident signal and the vibration signal;

Step 2: processing the incident signal to obtain a standard incident signal;

Step 3: respectively performing Fourier transform on the incident signal, the vibration signal and the standard incident signal after each knock to obtain respective corresponding frequency domain complex representation forms, which are respectively $X_i(f)$, $Y_i(f)$ and $X_0(f)$; and substituting $X_i(f)$, $Y_i(f)$ and $X_0(f)$ into an elastic wave radar algorithm theoretical formula to obtain a frequency domain representation form of a vibration signal similar to a radar wave:

$$Y_i'(f) = \frac{Y_i(f)}{X_i(f)} X_0(f).$$

and

Step 4: performing inverse Fourier transform on the frequency domain representation form of the vibration signal similar to the radar wave, so as to obtain a time domain waveform of the processed vibration signal.

2. The elastic wave radar detection method according to claim 1, wherein the vibration excitation device is a vibration excitation hammer, the vibration excitation hammer comprises a handle and a circular-arc-shaped hammer head, the handle is fixedly connected to the circular-arc-shaped hammer head, the first sensor is fixedly arranged on the circular-arc-shaped hammer head, and a direction of the first sensor is perpendicular to a circular arc surface, making contact with the ground, of the circular-arc-shaped hammer head.

3. The elastic wave radar detection method according to claim 1, wherein the vibration excitation device is a vibration excitation rod, the vibration excitation rod comprises a rod body, a connector, and a hammer head, one end of the rod body is provided with a first thread, one end of the connector is provided with a first screw hole corresponding to the first thread, and the connector is fixedly arranged on the rod body through the first thread and the first screw hole; the other end of the connector is provided with a second screw hole, one end of the hammer head is provided with a second thread corresponding to the second screw hole, and the hammer head is fixedly arranged on the connector through the second thread and the second screw hole; the other end of the hammer head is provided with a circular arc surface for making contact with the detected object; and the first sensor is fixedly arranged inside the rod body or the connector, and a direction of the first sensor is consistent with an axis direction of the rod body.

4. The elastic wave radar detection method according to claim 1, wherein Step 1 of knocking on different positions of the detected object through the vibration excitation device to obtain data for a plurality of knocks which comprise the incident signal and the vibration signal comprises:

performing free-fall knocking on different positions of the detected object by a vibration excitation rod, or directly knocking different positions of the detected object by a vibration excitation hammer; collecting the incident signal by the first sensor, and collecting the vibration signal by the second sensor, wherein a position knocked by the vibration excitation device is close to the second sensor, and a distance from the position knocked by the vibration excitation device to the second sensor is not more than one quarter of a thickness of the detected object.

5. The elastic wave radar detection method according to claim 2, wherein Step 1 of knocking on different positions of the detected object through the vibration excitation device to obtain data for a plurality of knocks which comprise the incident signal and the vibration signal comprises:

performing free-fall knocking on different positions of the detected object by a vibration excitation rod, or directly knocking different positions of the detected object by the vibration excitation hammer; collecting the incident signal by the first sensor, and collecting the vibration signal by the second sensor, wherein a position knocked by the vibration excitation device is close to the second sensor, and a distance from the position knocked by the vibration excitation device to the second sensor is not more than one quarter of a thickness of the detected object.

6. The elastic wave radar detection method according to claim 3, wherein Step 1 of knocking on different positions of the detected object through the vibration excitation device to obtain data for a plurality of knocks which comprise the incident signal and the vibration signal comprises:

performing free-fall knocking on different positions of the detected object by the vibration excitation rod, or directly knocking different positions of the detected object by a vibration excitation hammer; collecting the incident signal by the first sensor, and collecting the vibration signal by the second sensor, wherein a position knocked by the vibration excitation device is close to the second sensor, and a distance from the position knocked by the vibration excitation device to the second sensor is not more than one quarter of a thickness of the detected object.

7. The elastic wave radar detection method according to claim 4, wherein Step 2 of processing the incident signal to obtain the standard incident signal comprises:

the standard incident signal comprising a first vibration excitation standard wave, an average standard wave, a maximum-minimum intercepted standard wave and a minimum-maximum intercepted standard wave; collecting an incident signal waveform of a first knock, and taking a start point and an end point of the incident signal waveform of the first knock as a start point and an initial point of a standard sinusoidal half wave with an amplitude of 1 to obtain the first vibration excitation standard wave; collecting incident signal waveforms of all knocks, taking an average value of start points and an average value of end points of the incident signal waveforms of all knocks as a start point and an end point of a standard sinusoidal half wave with an amplitude of 1 to obtain the average standard wave; taking the maximum value of the start points and the minimum value of the end points of the incident signal waveforms of all knocks as a start point and an end point of a standard sinusoidal half-wave with an amplitude of 1 to obtain the maximum-minimum intercepted standard wave; and taking the minimum value of the start points and the maximum value of the end points of the incident signal waveforms of all knocks as a start point and an end point of a standard sinusoidal half wave with an amplitude of 1 to obtain the minimum-maximum intercepted standard wave.

8. The elastic wave radar detection method according to claim 5, wherein Step 2 of processing the incident signal to obtain the standard incident signal comprises:

the standard incident signal comprising a first vibration excitation standard wave, an average standard wave, a maximum-minimum intercepted standard wave and a minimum-maximum intercepted standard wave; collecting an incident signal waveform of a first knock, and taking a start point and an end point of the incident signal waveform of the first knock as a start point and an initial point of a standard sinusoidal half wave with an amplitude of 1 to obtain the first vibration excitation standard wave; collecting incident signal waveforms of all knocks, taking an average value of start points and an average value of end points of the incident signal waveforms of all knocks as a start point and an end point of a standard sinusoidal half wave with an amplitude of 1 to obtain the average standard wave; taking the maximum value of the start points and the minimum value of the end points of the incident signal waveforms of all knocks as a start point and an end point of a standard sinusoidal half-wave with an amplitude of 1 to obtain the maximum-minimum intercepted standard wave; and taking the minimum value of the start points and the maximum value of the end points of the incident signal waveforms of all knocks as a start point and an end point of a standard sinusoidal half wave with an amplitude of 1 to obtain the minimum-maximum intercepted standard wave.

9. The elastic wave radar detection method according to claim 6, wherein Step 2 of processing the incident signal to obtain the standard incident signal comprises:

the standard incident signal comprising a first vibration excitation standard wave, an average standard wave, a maximum-minimum intercepted standard wave and a minimum-maximum intercepted standard wave; collecting an incident signal waveform of a first knock, and taking a start point and an end point of the incident signal waveform of the first knock as a start point and an initial point of a standard sinusoidal half wave with an amplitude of 1 to obtain the first vibration excitation standard wave; collecting incident signal waveforms of all knocks, taking an average value of start points and an average value of end points of the incident signal waveforms of all knocks as a start point and an end point of a standard sinusoidal half wave with an amplitude of 1 to obtain the average standard wave; taking the maximum value of the start points and the minimum value of the end points of the incident signal waveforms of all knocks as a start point and an end point of a standard sinusoidal half-wave with an amplitude of 1 to obtain the maximum-minimum intercepted standard wave; and taking the minimum value of the start points and the maximum value of the end points of the incident signal waveforms of all knocks as a start point and an end point of a standard sinusoidal half wave with an amplitude of 1 to obtain the minimum-maximum intercepted standard wave.

* * * * *